United States Patent [19]
Wong et al.

[11] Patent Number: 5,909,695
[45] Date of Patent: *Jun. 1, 1999

[54] MAXIMAL CONCURRENT LOOKUP CACHE FOR COMPUTING SYSTEMS HAVING A MULTI-THREADED ENVIRONMENT

[75] Inventors: Thomas K. Wong, Pleasanton; Theron D. Tock, Sunnyvale, both of Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/773,258

[22] Filed: Dec. 23, 1996

Related U.S. Application Data

[62] Division of application No. 08/543,105, Oct. 13, 1995, Pat. No. 5,701,432.

[51] Int. Cl.$^6$ .................................................. G06F 12/00
[52] U.S. Cl. ........................... 711/133; 711/118; 711/129; 711/130; 711/134; 711/136; 711/144; 711/152; 711/153; 711/159; 711/160; 711/163; 711/167; 711/173; 711/113; 711/128
[58] Field of Search ..................................... 711/113, 136, 711/144, 118, 152, 159–160, 167, 128, 129–130, 133, 134, 153, 163, 173

[56] References Cited

U.S. PATENT DOCUMENTS

| 4,736,293 | 4/1988 | Patrick .................................... 395/455 |
| 4,926,323 | 5/1990 | Baror ..................................... 395/585 |
| 4,977,998 | 12/1990 | Rastegar .................................... 395/455 |
| 5,325,504 | 6/1994 | Tupley et al. ............................ 395/455 |
| 5,353,425 | 10/1994 | Malamy et al. ......................... 395/471 |
| 5,546,555 | 8/1996 | Horstmann et al. .................... 711/207 |

FOREIGN PATENT DOCUMENTS

| 737 917 A2 | 10/1996 | European Pat. Off. . |
| 800 134 A2 | 10/1997 | European Pat. Off. . |

OTHER PUBLICATIONS

G. Fairhurst et al: "NeWS and Simula: An extensible graphics language for an extensible programming language?" Proceedings of the Seventeenth Simula Users' Conferene, Aug. 29–31, 1990, Pilsen, Czehoslovakia, pp. 33–45.

(List continued on next page.)

*Primary Examiner*—Tod R. Swann
*Assistant Examiner*—Denise Tran
*Attorney, Agent, or Firm*—Burns, Doane, Swecker & Mathis, LLP; Holland & Hart LLP

[57] ABSTRACT

A multi-threaded processing system has a cache that is commonly accessible to each thread. The cache has a plurality of entries for storing items, each entry being identified by an entry number. The location in the cache of an item that includes a first key is determined by supplying the first key to a lockless-lookup engine which then provides a lookup output that is alternatively a lookup entry number or an indication that the item is not stored in the cache. The lookup entry number is alternatively a first or second entry number, wherein the first entry number points to a first entry in which the item is stored and the second entry number points to a second entry in which the item is not stored. If the lookup output is the lookup entry number, then it is verified that the lookup entry number is the first entry number. This verification includes acquiring a mutual exclusion lock on the entry designated by the lookup entry number, using the lookup entry number to read a stored key from the cache, and comparing the first key with the stored key. If the two keys match, then the item has been located. Other aspects of the invention address the situations where the two keys do not match, or where the lookup output is the indication that the item is not stored in the cache.

18 Claims, 12 Drawing Sheets

OTHER PUBLICATIONS

H. Muller et al: "The Use of Multimethods and Method Combination in a CLOS Based Window Interface" OOPSLA '89—Conference Proceedings, Oct. 1–6, 1989, New Orleans, Louisiana, US, pp. 239–262, XP000299247 *the whole document*.

W. C. Dietrich Jr., et al: "Saving a Legacy with Objects" OOPSLA '89 Proceedings, Oct. 1–6 1989, New Orleans, Louisiana, US, pp. 77–83 XP000299231 *the whole doument*.

Yelland P M: "Creating Host Compliance in a Portable Framework: A Study in the Reuse or Design Patterns" ACM Sigplan Notices, vol. 31, No. 10, Oct. 1996, pp. 18–29, XP000639198 *the whole document*.

O.M. Densmore: "Objects Oriented Programming in NeWS" Usenix Association—Third Computer Graphics Workshop—Proceedings, Nov. 20–21, 1986, Monterey, CA, US, pp. 117–135, XP0002053405 *the whole document*.

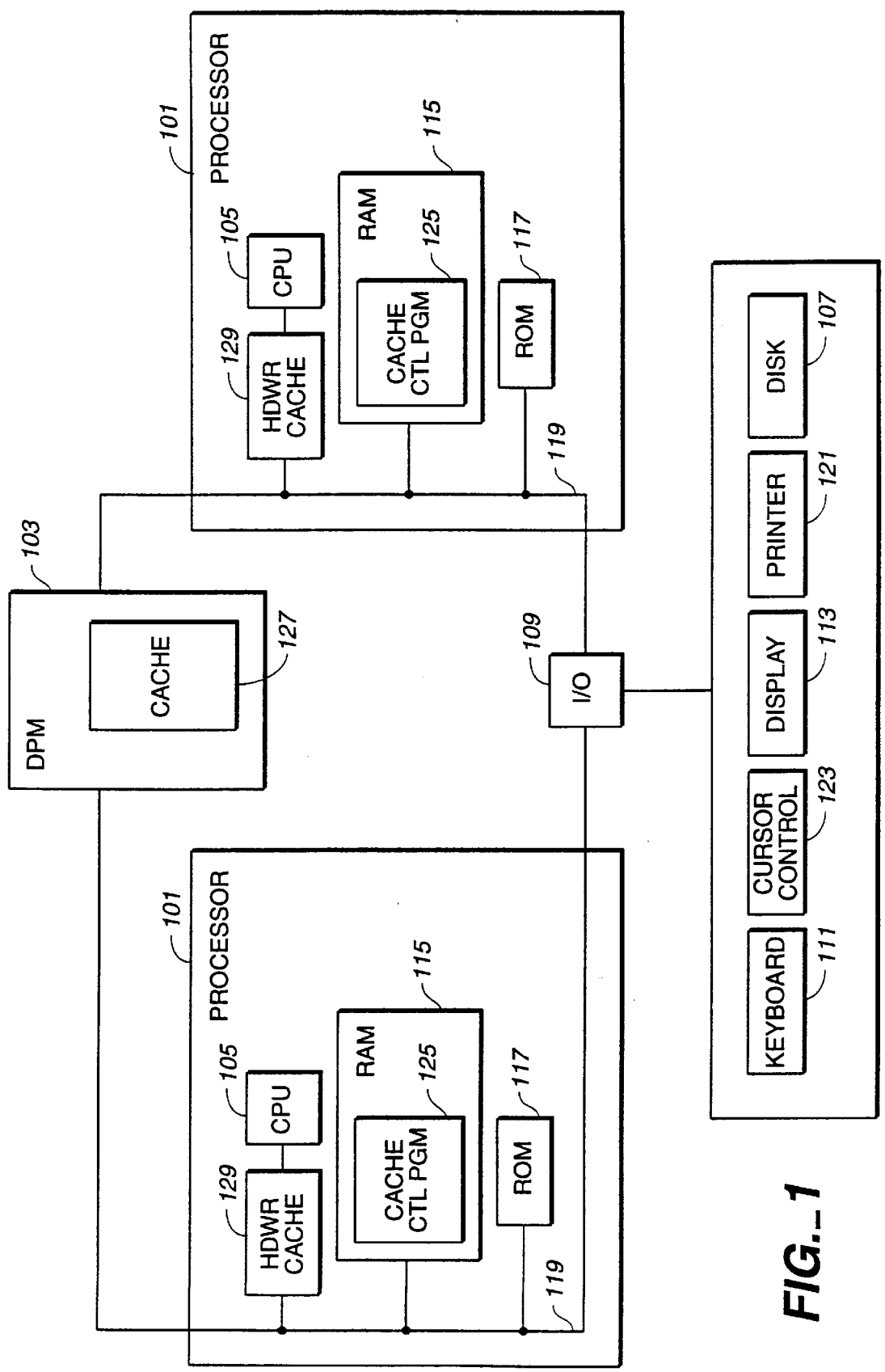
FIG._1

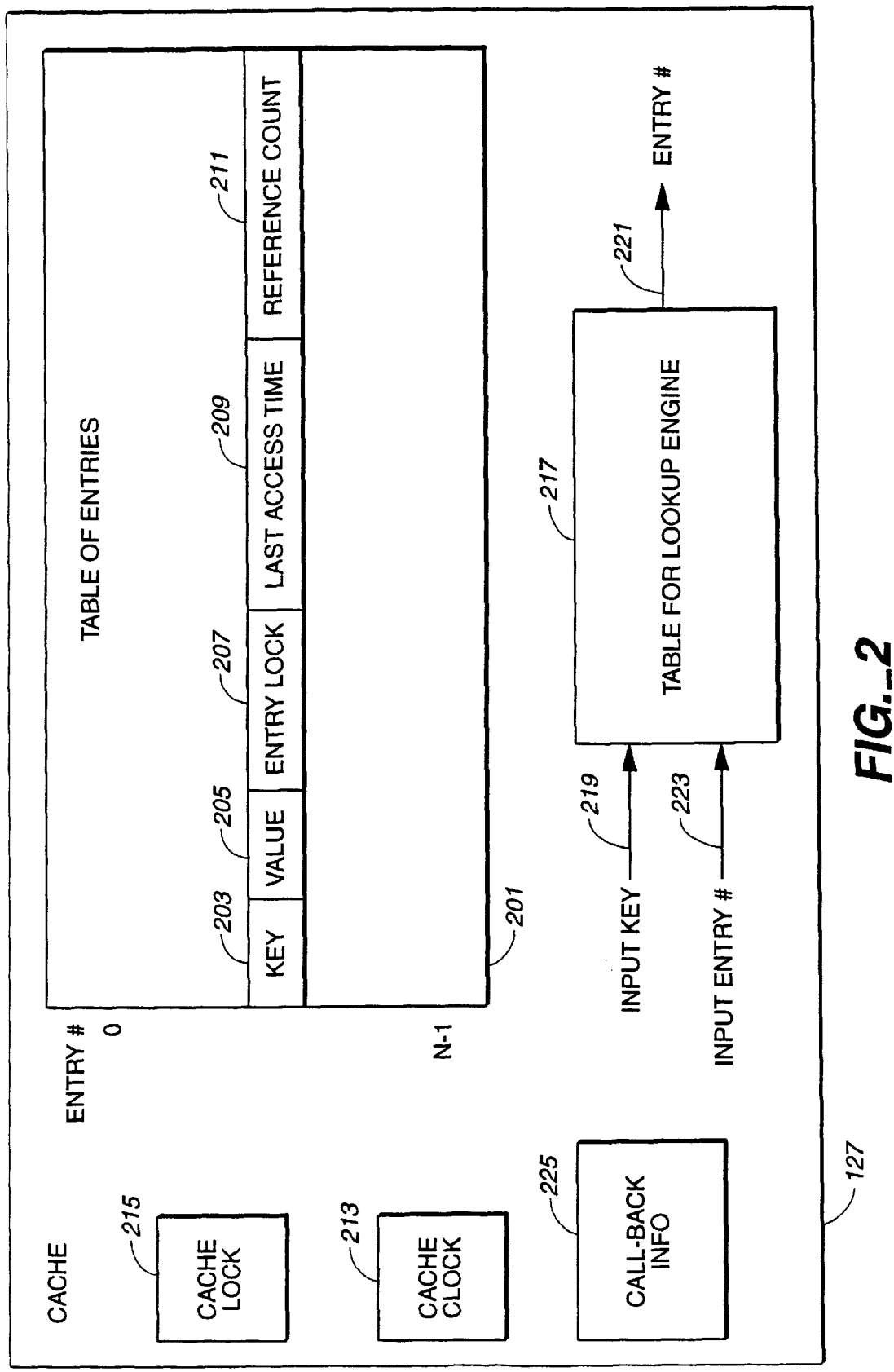
FIG._2

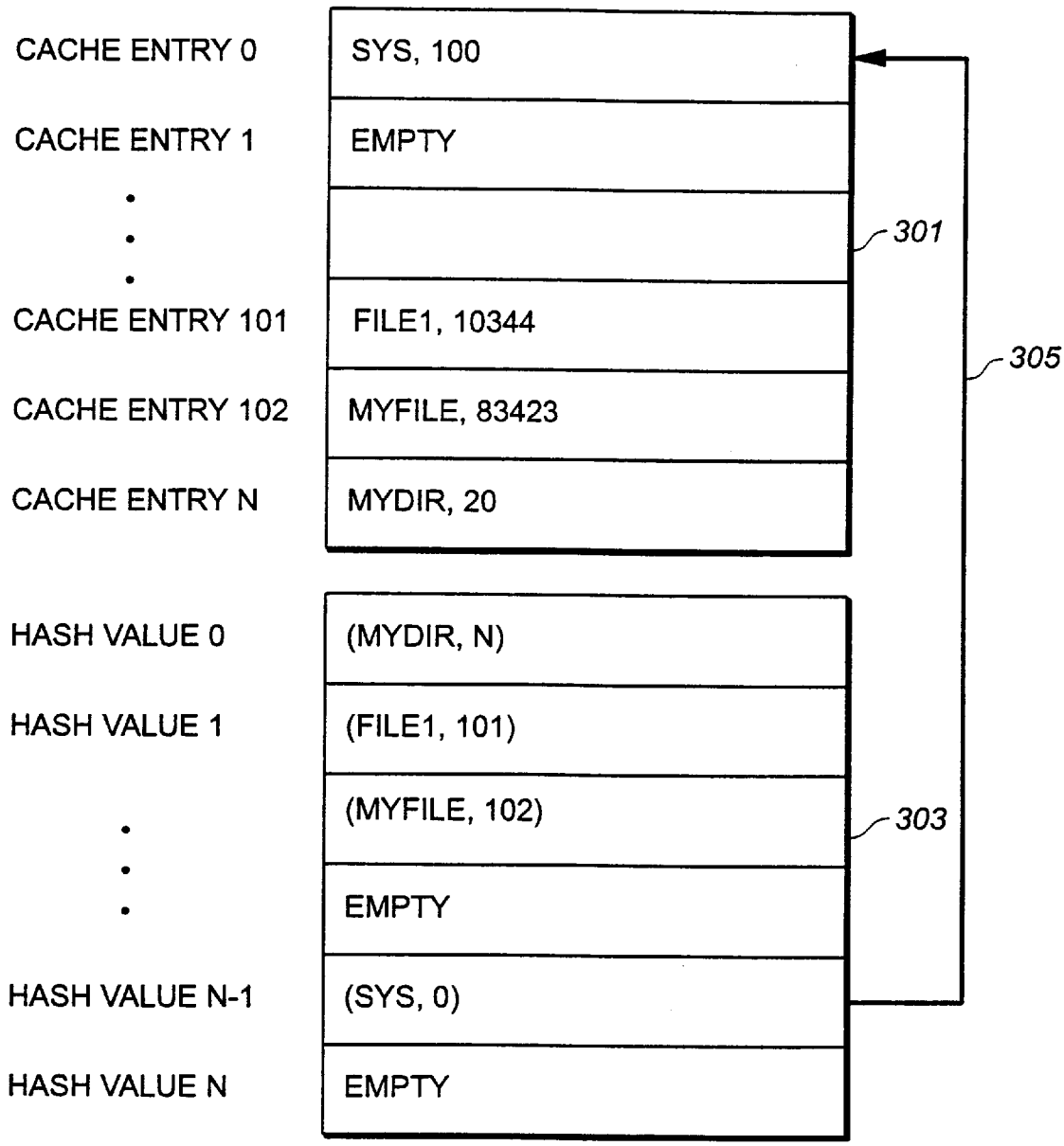
FIG._3

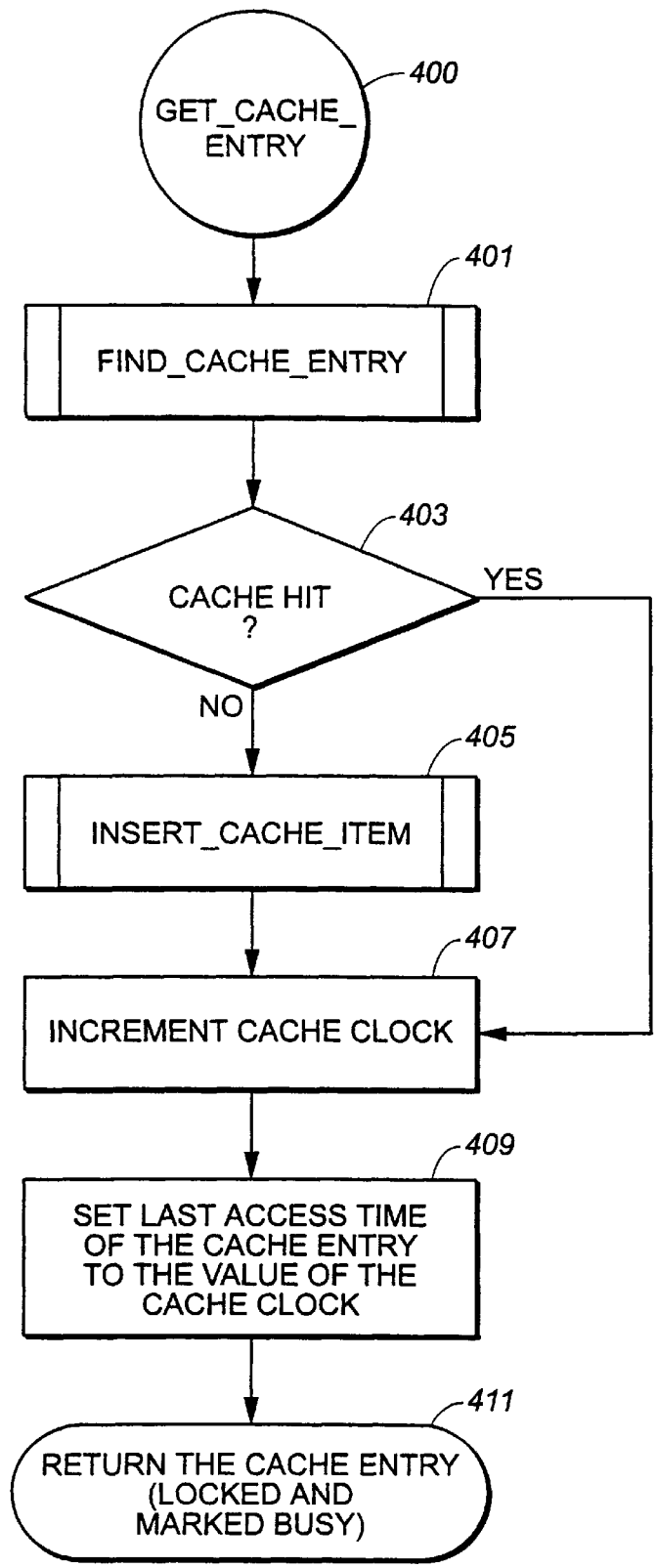
FIG._4

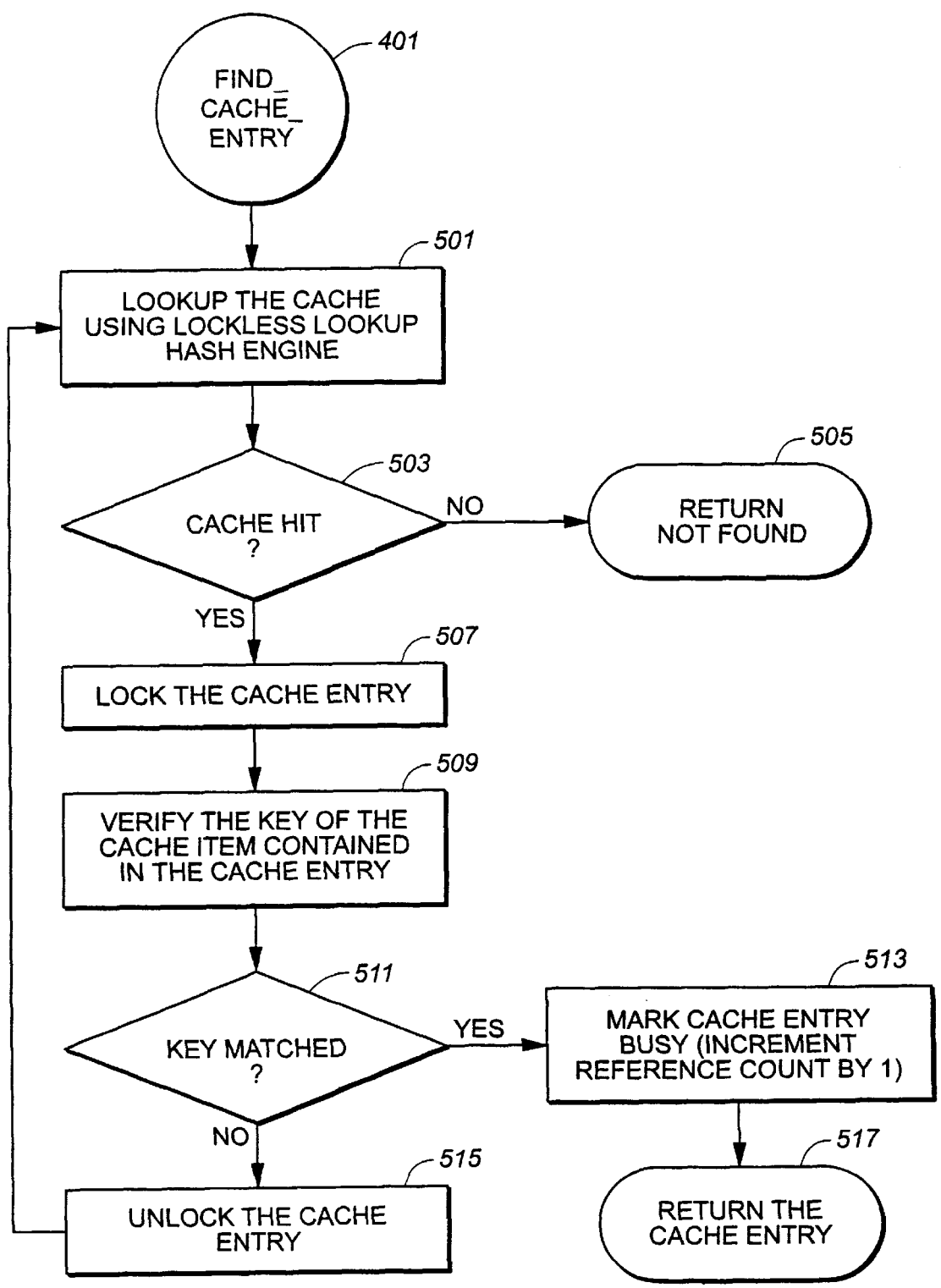
FIG._5

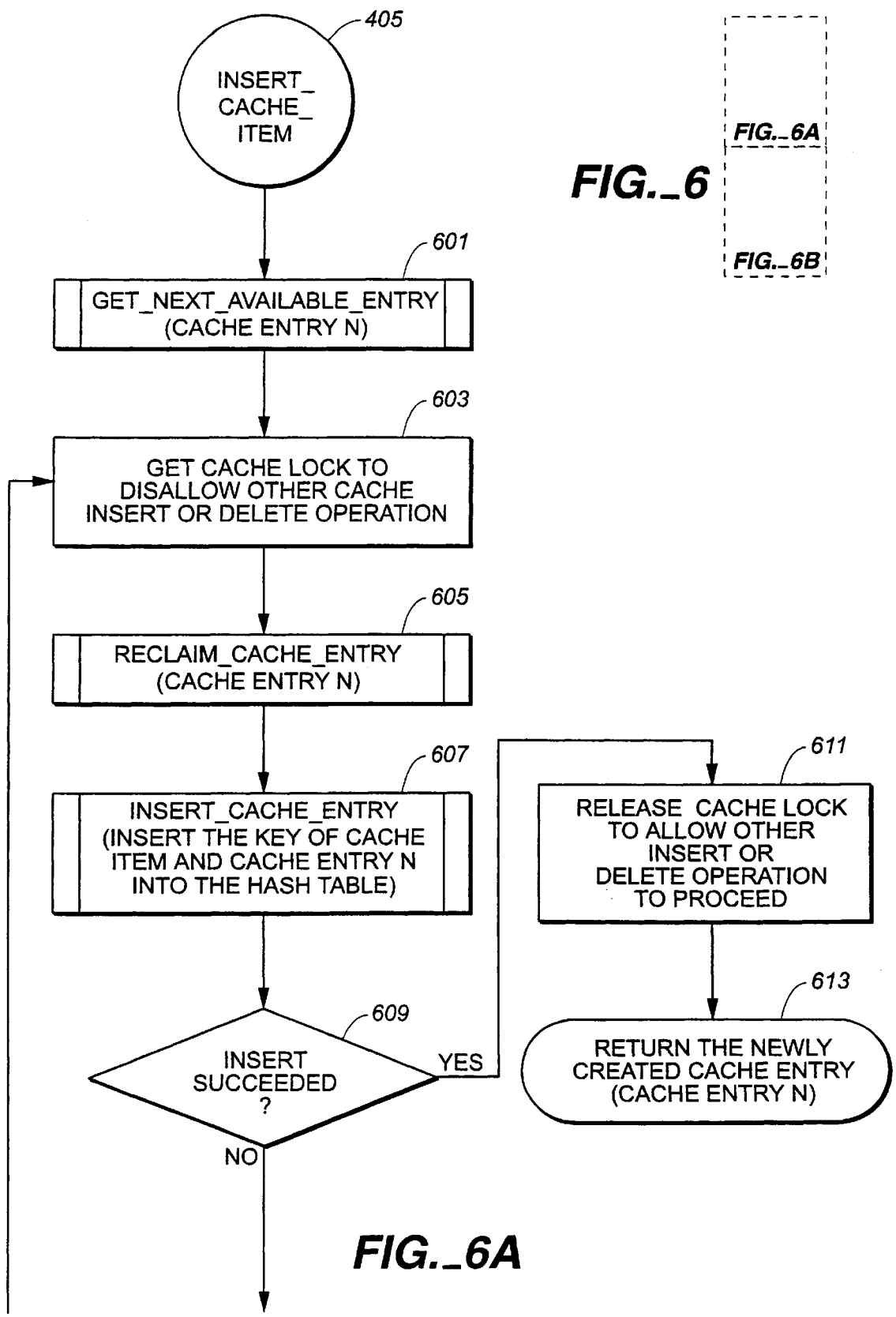
FIG._6A

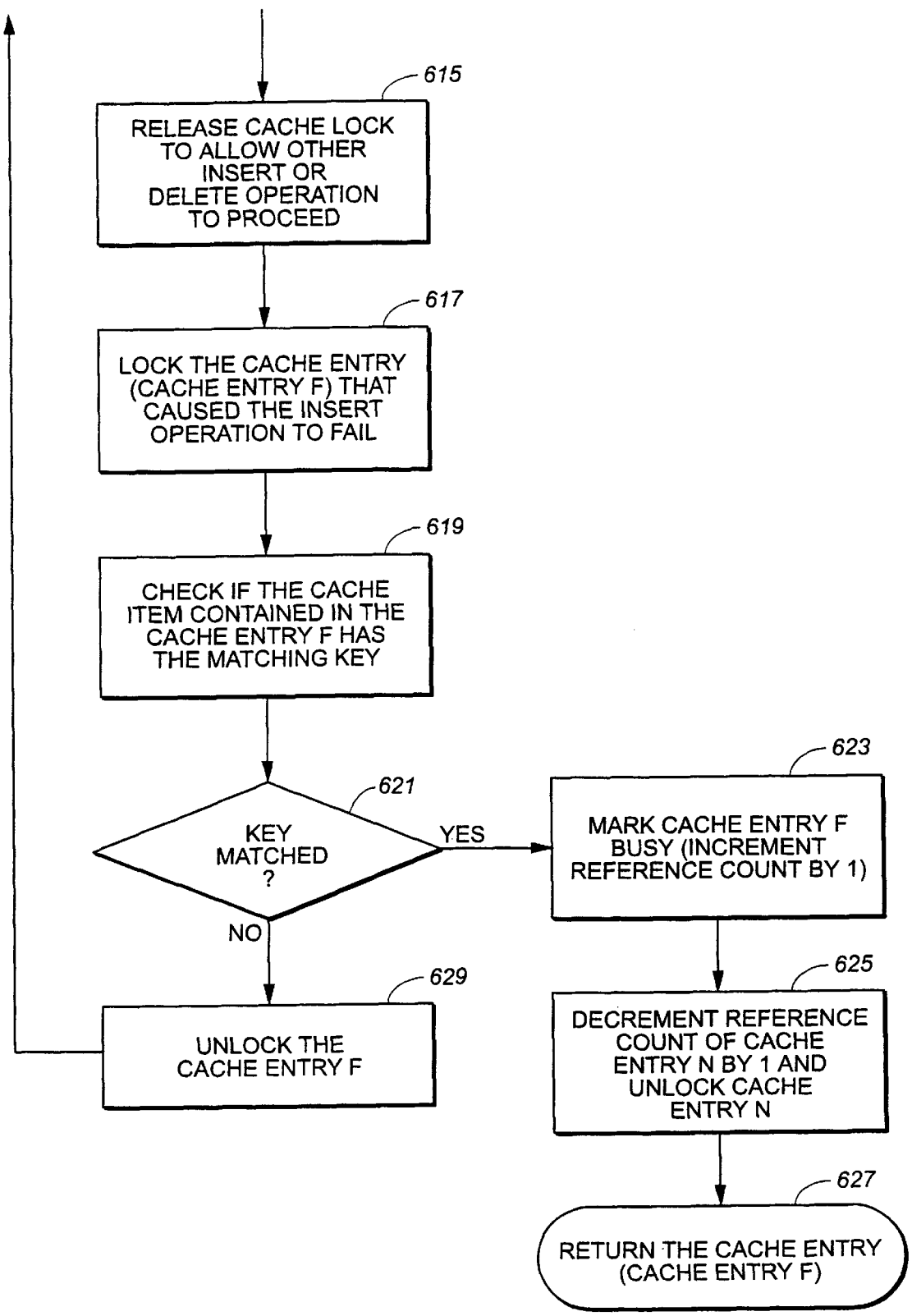
FIG._6B

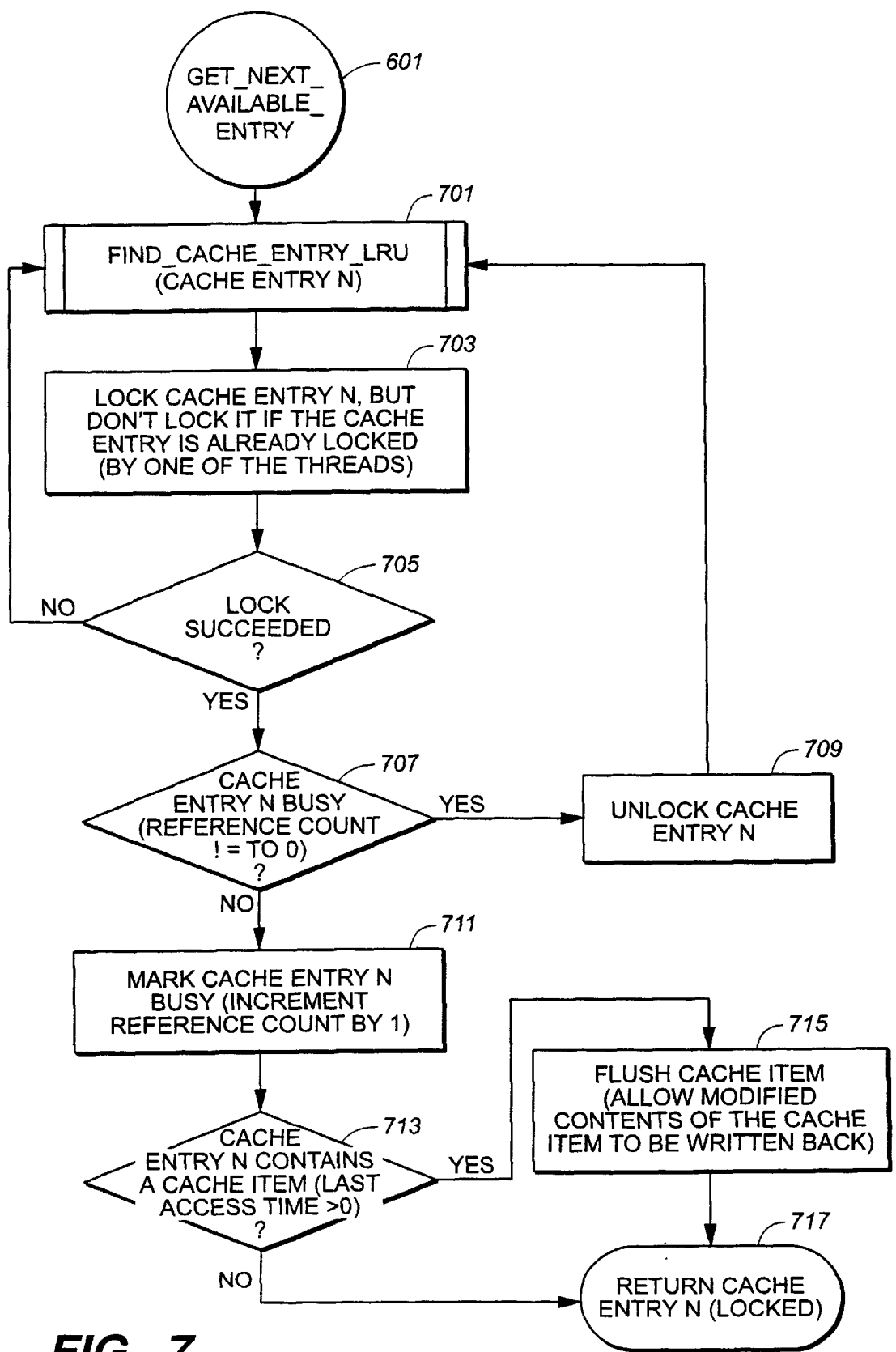
FIG._7

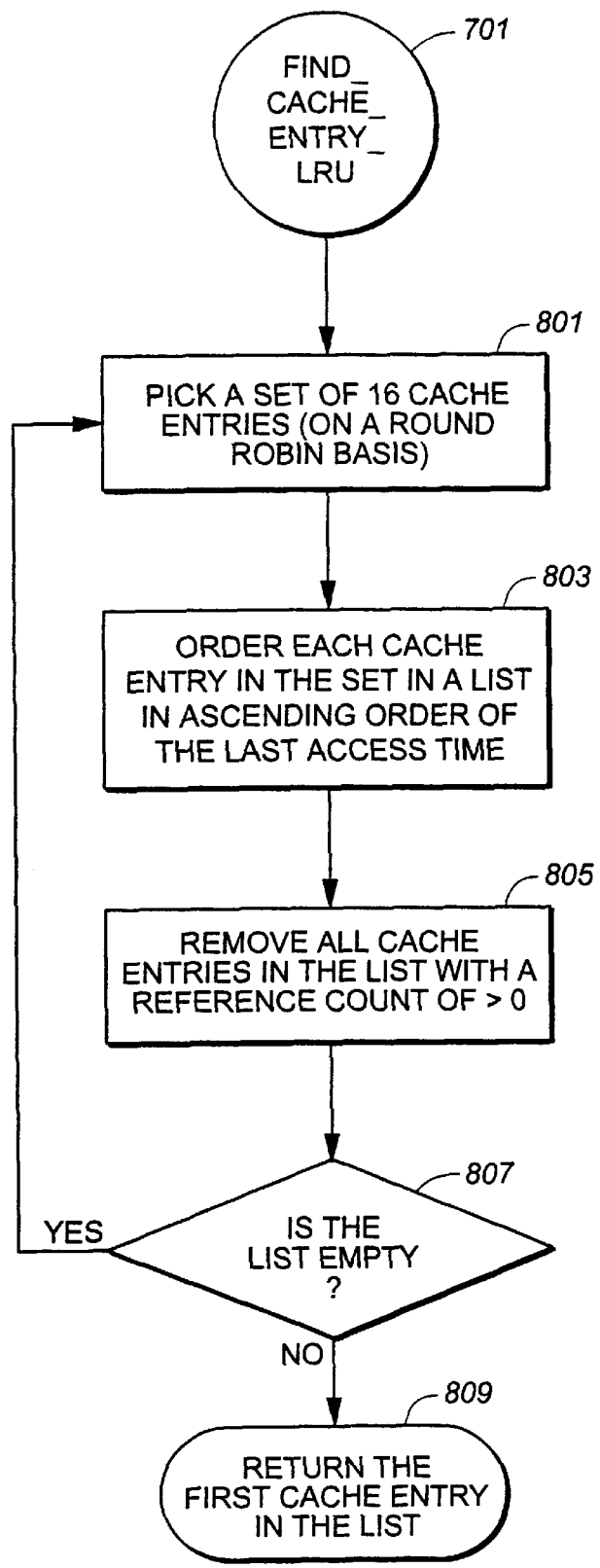
FIG._8

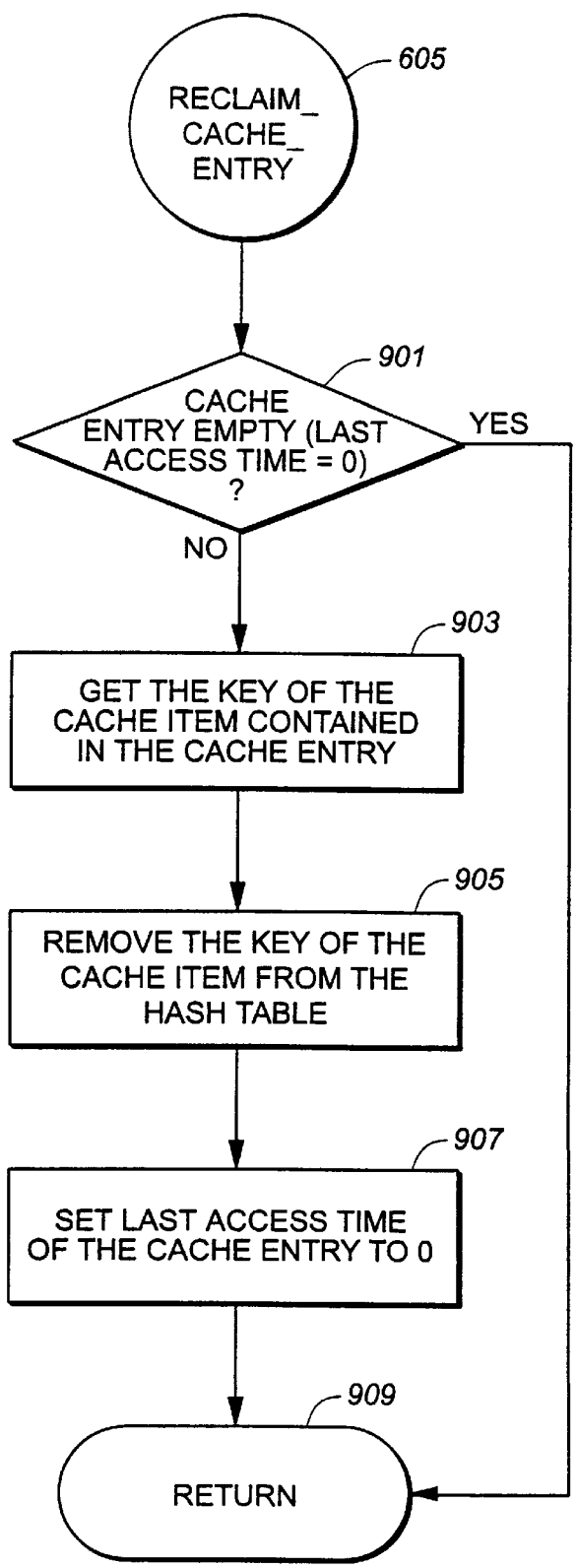
FIG._9

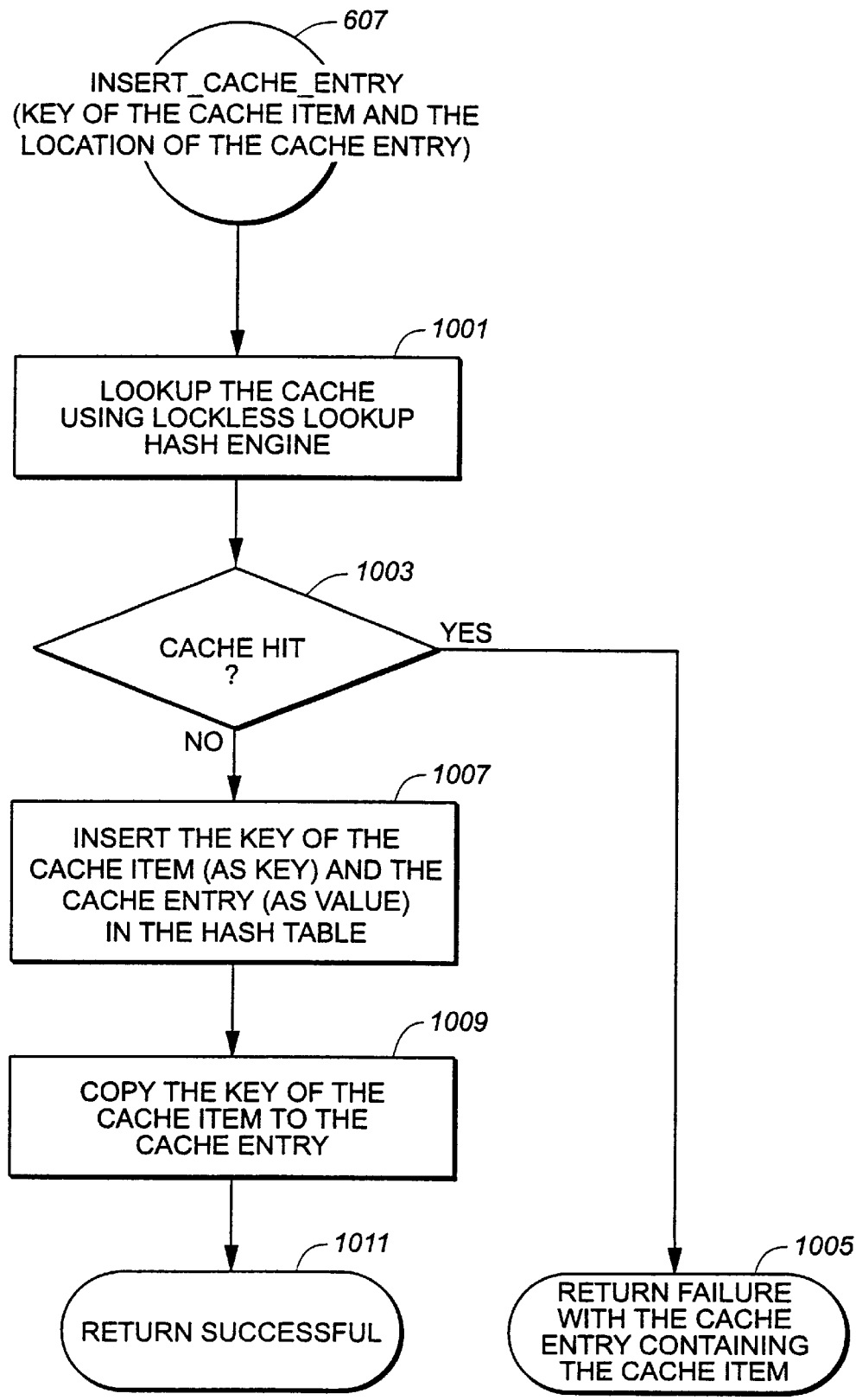
FIG._10

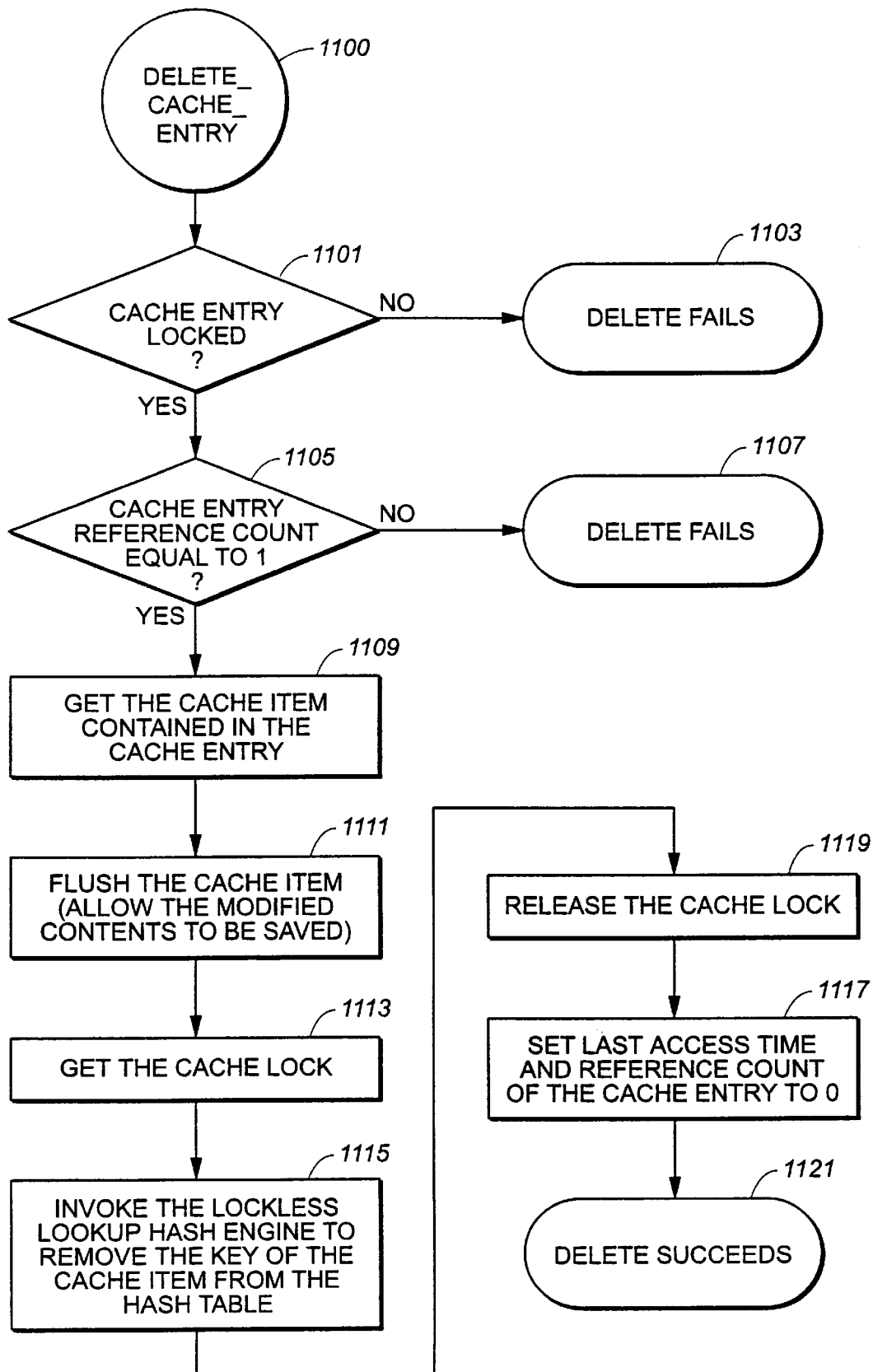
FIG._11

MAXIMAL CONCURRENT LOOKUP CACHE FOR COMPUTING SYSTEMS HAVING A MULTI-THREADED ENVIRONMENT

This application is a divisional of application Ser. No. 08/543,105, filed Oct. 13, 1995, U.S. Pat. No. 5,701,432.

BACKGROUND

1. Field of the Invention

The present invention relates to shared caches in processing systems having multi-threaded environments, and more particularly to a cache for use in a multi-threaded environment, wherein the cache permits lookup operations to take place concurrently with a cache insert or delete operation.

2. State of the Related Art

As used throughout this disclosure, the term "cache" is a region in a computer memory that holds a subset of a larger collection of data. If an item of information is stored in a cache, a search for the item in the cache will succeed (called a "cache hit") and very little effort is consumed. However, a search for an item of information that is not in the cache (called a "cache miss") usually results in an expensive and time-consuming effort to retrieve the item of information from the larger collection of data. To maximize the number of cache hits, data that is likely to be referenced in the near future is stored in the cache. Two common strategies for maximizing cache hits are: storing the most recently referenced data, and storing the most commonly referenced data.

Caches are frequently employed to improve the performance of computer operating systems (OSs). For example, the Sun "SOLARIS™" OS (Sun and Solaris are trademarks or registered trademarks of Sun Microsystems, Inc. in the United States and other countries) uses a directory name lookup cache for storing the names of most recently accessed files, a file attribute cache for storing the attributes of most recently accessed files, and a disk buffer cache for storing the most recently accessed disk blocks.

It is possible for a cache to be shared by a number of concurrently operating threads of execution, which will henceforth be referred to throughout this specification as "threads." Such concurrent operation may result from each thread being assigned to a corresponding one of a number of processors in a multi-processor environment. Alternatively, logical concurrence may be achieved by an operating system using "time slice" techniques on only a single processor. Frequently, these two strategies are combined, so that each processor in a multi-processor system may employ time slicing.

In a computer processing system that provides a multi-threaded environment (e.g., a system having multiple processing units), conventional techniques employ a mutual exclusion lock to allow cache access to only one thread at a time whenever an insert, delete, or lookup operation is to be performed. This is to ensure that the information stored in a cache is accessed or updated atomically, thereby preventing transitory inconsistencies, which occur during update operations, from causing lookup operations to return incorrect results. Mutual exclusion locks are known in the art and are not described here in detail. Some locks can be implemented entirely in software without any hardware support. The most common special hardware support for mutual exclusion is the Test and Set operation. However, these two solutions (i.e., all-software and hardware-supported locks) have a drawback in that the use of busy-wait loops are difficult to design and do not allow a queue discipline to be used. Specialized language features such as semaphores and monitors may be applied to solve general concurrent programming problems requiring mutual exclusion, such as the Producer-Consumer and Reader-Writer problems. For more detailed information, reference is made to the following publications, which are incorporated herein by reference: A. Burns & G. Davis, *Concurrent Programming*, pp. 64–68, 175–184, Addison Wesley, 1993.

The use of software locks to ensure the consistency of a cache in a system having a multi-threaded environment negatively affects the performance of that system in a way that worsens as more and more threads are included. For example, where the multi-threaded environment is one having multiple processing units (CPUs), idle processes waiting to acquire the software lock of a cache will not be using valuable processor time. Moreover, even in systems where the multiple processes are provided by means of time slicing on a single processor, a waiting thread is a candidate to be swapped or paged out by the operating system. The additional workload imposed on the operating system to page/swap these threads in and out further reduces the scalability of the computing system.

The above discussion has related to caches in general. However, a cache may be organized in accordance with any one of three paradigms:

1) A "directly mapped" cache is one in which each item to be stored has only one cache location into which it can be stored. This mapping is one-way in that each cache location could potentially hold any of a number of different items. For example, cache entry 1 might be designated for storing all items beginning with the letter "a". If an attempt is made to insert an item "aa" into a cache that already has item "ab" in it, the item "ab" would have to be thrown out.

2) A "fully associative" cache is one in which a data item to be stored could potentially be placed into any cache location.

3) A "set-associative" cache is one in which a data item to be stored could potentially be placed into any one of a predetermined set of cache locations.

Many applications require, for proper functioning of a cache, that each item of information stored in the cache be unique; duplicates of an item are not allowed to be stored in the cache. The simplest solution to ensure cache consistency is to employ a mutual exclusion lock on the entire cache, thereby allowing only one insert, one delete, or one lookup operation to the cache at a time.

For directly mapped and set-associative caches, a greater number of fine-grained mutual exclusion locks may be utilized to allow for more concurrent accesses to the cache. Thus, instead of employing only one mutual exclusion lock for the entire cache, there is one mutual exclusion lock for each location (directly mapped) or set of locations (set-associative) in the cache. If accesses to the cache occur randomly, having multiple mutual exclusion locks increases concurrent accesses since it reduces the probability of conflicts in acquiring the particular lock required for applying a given cache operation.

Typically, cache lookups occur much more frequently than insertions and deletions. To take advantage of this access pattern, the mutual exclusion lock used by a cache to maintain consistency may be replaced with a read-write lock. A read-write lock allows multiple concurrent cache lookups because these do not modify the contents of the cache. However, if one thread is performing either an insertion or a deletion, then all other threads are disallowed from accessing the entire cache for any reason, be it for another insertion, deletion or for lookup of an item. Thus, one thread's insertion or deletion can cause many other threads to be left idle.

In summary, the use of one or more software locks to ensure the consistence of a cache in a multi-threaded system reduces concurrent accesses to the cache and negatively affects the scalability of the system.

SUMMARY OF THE INVENTION

A multi-threaded processing system has a cache that is commonly accessible to each thread. The cache has a plurality of entries for storing items, each entry being identified by an entry number. The location in the cache of an entry that includes a first key is determined by supplying the first key to a lockless-lookup engine which then provides a lookup output that is a lookup entry number. The lookup entry number is alternatively a first or second entry number, wherein the first entry number points to a first entry in which the item is stored and the second entry number points to a second entry in which the item is not stored. In this respect, the lookup entry number may be considered to provide merely a "hint" at the desired entry number. It is then verified that the lookup entry number is the first entry number. This verification includes acquiring a mutual exclusion lock that grants exclusive access at least to the entry designated by the lookup entry number, using the lookup entry number to read a stored key from the entry designated by the lookup entry number, and comparing the first key with the stored key. If the two keys match, then the item has been located.

In one embodiment of the invention, the mutual exclusion lock grants exclusive access only to the entry designated by the lookup entry number.

In another aspect of the invention, if the first key does not match the stored key, then the mutual exclusion lock is released. Then, the lockless lookup engine is again accessed in search of the item.

In yet another aspect of the invention, the lookup output is alternatively the lookup entry number or an indication that the item is not stored in the cache. If the lookup output is the indication that the item is not stored in the cache, then a second verification is performed. This comprises acquiring a mutual exclusion lock on the cache to disallow insertions and deletions to the cache, and using the lockless-lookup engine to provide a second lookup output that is alternatively the first entry number or the indication that the item is not stored in the cache, wherein the item has been located if the second lookup output is the first entry number.

In still another aspect of the invention, if the second lookup output is the indication that the item is not stored in the cache, then the first key is stored at a new cache entry and a new element is stored into the lockless-lookup engine, wherein the new element comprises the first key and a new entry number that identifies the new cache entry.

In yet another aspect of the invention, the lockless-lookup engine is a lockless-lookup hash table.

BRIEF DESCRIPTION OF THE DRAWINGS

The present invention will be understood by reading the following detailed description in conjunction with the drawings in which like parts are identified with the same reference characters:

FIG. 1 is a block diagram of an exemplary multi-threaded system for use with the invention;

FIG. 2 is a block diagram of a cache in accordance with an embodiment of the present invention;

FIG. 3 is a diagram illustrating the relationship between cache entries and hash table entries in accordance with one aspect of the invention;

FIG. 4 is a flow chart of a get_cache_entry routine in accordance with one embodiment of the invention;

FIG. 5 is a flow chart of a find_cache_entry routine in accordance with one embodiment of the invention;

FIG. 6 is a flow chart of an insert_cache_item routine in accordance with one embodiment of the invention;

FIG. 7 is a flow chart of a get_next_available_entry routine in accordance with aspect of the invention;

FIG. 8 is a flow chart of a find_cache_entry_least_recently_used routine in accordance with one aspect of the invention;

FIG. 9 is a flow chart of a reclaim_cache_entry routine in accordance with one aspect of the invention;

FIG. 10 is a flow chart of an insert_cache_entry routine in accordance with one aspect of the invention; and FIG. 11 is a flow chart of a delete_cache_entry routine in accordance with one aspect of the invention.

DETAILED DESCRIPTION

An embodiment of the invention provides a fully associative cache that may be used in a multi-threaded environment. Insertions to, and deletions from, the inventive cache are serialized by means of a cache-wide lock (henceforth referred to as "cache lock"). However, concurrent lookup operations to get items already stored in the cache are unimpeded by the cache lock. Thus, the inventive cache achieves substantial throughput improvements in multi-threaded environments. These and other characteristics of the inventive cache will become apparent from the more detailed description below.

In a preferred embodiment, the cache is implemented on a Sun workstation and/or server having multiple "SPARC™" processing units. (Sun and SPARC are trademarks or registered trademarks of Sun Microsystems, Inc., in the United States and other countries.) Referring now to FIG. 1, an exemplary computer system for utilizing the inventive techniques is shown. The system includes two identical processors 101, each coupled to a common dual-port memory (DPM) 103 via a hardware cache 129 (not to be confused with the inventive cache described here). Each processor 101 includes a central processing unit (CPU) 105, a random access memory (RAM) 115, a read-only memory (ROM) 117, and a common system bus 119 connecting each of the above elements. Each processor 101 is also connected, via the bus 119, to a shared input/output (I/O) controller 109. The I/O controller 109 allows the processors to be coupled to the disk 107, the input devices 111 and 123, and to the output devices 113 and 121. Each of these components is well-known in the art, and need not be described here in further detail.

Each processor 101 includes a number of pieces of software which can be executed by the CPU 105. One of those pieces of software is an operating system, which may alternatively execute out of the ROM 117 or the RAM 115. "SOLARIS™" is the preferred operating system. (Sun and Solaris are trademarks or registered trademarks of Sun Microsystems, Inc. in the United States and other countries.) Operating systems are well-known in the art, and the description of the operating system is beyond the scope of this specification. In an alternative embodiment, the system may have only a single processor 101 and an operating system that has multitasking capability, so that threads may operate concurrently. In this alternative embodiment, it is the multiple threads that are allowed common and concurrent access to a cache stored in a memory. In yet another alternative embodiment, multiple processors are provided in a system, wherein each processor runs an operating system that has multitasking capability.

Returning to the embodiment depicted in FIG. 1, each of the processors 101 operates independently from one another by executing programs stored in either the RAM 115 or ROM 117. In this example, each processor 101 includes a cache control program 125 which governs that processor's access to a cache 127 which is stored in the DPM 103.

The inventive cache 127 will now be described in greater detail with reference to FIG. 2. A table of entries 201 is provided for storing the items of information in the cache (henceforth referred to as "cache items"). A cache item may be stored in any of the N locations, or entries (henceforth referred to as "entries"), of the table of entries 201. Each entry in the table of entries 201 is uniquely associated with an entry number, which is used as a pointer to the entry in the table of entries 201. Each entry has fields for storing the following information: a key 203, a data value 205, an entry lock 207, a last access time 209, and a reference count 211. The key 203 and value 205 together constitute the item of information that the cache user wishes to store and or retrieve. The value 205 may be any type of structure that the cache user defines (e.g., immediate data operand, or pointer to another memory location). In a preferred embodiment, users of the cache must abide by the restriction that no memory location may ever be deallocated if a pointer to that location is stored as a key 203 or a value 205 in a cache entry that is marked "busy." The reason for this is that other threads may have obtained that pointer from the cache, and may utilize it without the knowledge that the memory has been deallocated. Results after such an occurrence are unpredictable.

The entry lock 207, last access time 209 and reference count 211 are housekeeping items that are utilized by the cache control program 125. Briefly, the entry lock 207 allows a holder of the lock to prevent the associated cache entry (and only that entry) from being changed or removed by another thread.

The last access time 209 is obtained from a cache clock 213, which preferably increases monotonically whenever any cache entry is accessed. Each time a cache entry is accessed (i.e., inserted into or retrieved from the cache table of entries 201), its last access time 209 is set to the current value of the cache clock 213. A cache entry that does not contain a cache item will have a last access time 209 equal to zero. As will be explained in greater detail below, this information may be used by a cache replacement routine to determine, among other things, which of a number of cache entries is the least recently used (the more recently used a cache entry is, the greater its last access time value will be).

The reference count 211 is a number that is initialized to zero, and then incremented each time the associated cache item is obtained by a thread. If a thread decides to no longer use the cache item, then it is responsible for decrementing the reference count 211. Because a reference count greater than zero indicates that the cache item is in use, any thread wishing to ensure that the cache item will never be reclaimed and reused simply needs to do nothing to the reference count 211 after it has obtained the cache item.

Further associated with the cache 127 is a cache lock 215 for serializing insertion and deletion of cache items, allowing only one such operation to proceed at a time. Cache lookups can take place while a cache delete or insert operation is in progress. This characteristic is referred to here as "lockless-lookup." The lookup operation will not be delayed by the concurrent insertion unless the lookup is to the same entry number as that which is being inserted. Lookup operations are more likely to be occasionally delayed by a concurrent delete operation. The reason for these occasional delays will become apparent below.

As mentioned earlier, the cache 127 is fully associative, so that a cache item may be stored at any cache entry. In accordance with the present invention, a lockless lookup engine is provided in order to help expedite the searching of cache items in the table of entries 201. The lockless lookup engine comprises two parts: a table 217 and a lookup engine control program (not shown). The table 217 for the lookup engine is preferably included in the cache 127. The corresponding lookup engine control program is preferably incorporated into the cache control program 125.

The purpose of the lookup engine is to receive an input key 219, and to generate therefrom an entry number 221 that points to an entry in the table of entries 201. Consequently, in addition to the just-described lookup function, the lookup engine should itself support insertion and deletion operations in respective correspondence with cache insertion and deletion operations. That is, when a cache item is to be inserted into an available cache entry, the key 203 associated with the cache item and the entry number of that item in the table of entries 201 will be provided as inputs 219 and 223 to the lookup engine table 217 so that the latter can record the association for future use. Similarly, the lookup engine should itself support deletion of a key and its associated entry number from its lookup mechanism if the cache 127 permits deletion of a corresponding cache item from its table of entries 201.

In order to maximize efficiency of the cache 127, the lookup engine should not have any software locks of its own, but rather should rely on those provided for use by the cache as a whole. Thus, the lookup engine will be expected to operate under conditions in which its own insertion and deletion operations are serialized, but in which lookup operations will be permitted to occur at any time. In a multi-threaded environment, it can therefore be anticipated that lookup operations may not always give accurate results. For example, a lookup engine may erroneously return a result of "element not found" (an "element" consists of a key plus its associated entry number) when in fact the desired element was being concurrently written by another thread. The lookup engine may also erroneously return the entry number 221 of an element that has just been deleted. Furthermore, the lookup engine may return an incorrect entry number 221 for an element if that element is being concurrently modified by another thread.

In accordance with the present invention these "hints" (as opposed to guaranteed accurate answers) which are provided by the lookup engine are acceptable, so long as the lookup engine at least provides the guarantee that no lookup operation will ever return an entry number 221 that had never been inserted as part of a valid element at some time by one of the threads in the system. In other words, the lookup engine must never be permitted to return an uninitialized value as an entry number 221. The reason for this requirement is that the entry value will be used as a pointer for addressing the cache's table of entries 201. Consequently, a random value could cause a system failure. By guaranteeing that, in the worst case, an entry number 221 merely points to an actual, albeit wrong, entry in the table of entries 201, the above-described system failures can be avoided.

In accordance with a preferred embodiment, the lookup engine is a lockless-lookup hash table that requires serialization of only insertion and deletion operations, while permitting concurrent lookup operations to take place with the guarantee that no value will ever be returned that had not previously been written into the hash table by one of the threads in the system. Such a hash table is described in detail in Tock et al.'s U.S. patent application Ser. No. 08/543,215, now abandoned, entitled "Efficient Hash Table For Use In Multi-Threaded Environments," assigned to the same assignee as that of this invention, and incorporated herein by reference in its entirety.

The use of the lockless-lookup hash table as the lookup engine for the cache 127 will now be illustrated in FIG. 3. In this example, the cache table of entries 301 is a directory name lookup cache, where each key 203 is a filename, and each value 205 is a file number. The purpose of such a cache is to store names and corresponding file numbers of the most recently accessed files. As illustrated, the cache item whose key is "sys" is stored at cache entry 0; the cache item whose key is "file 1" is stored at cache entry 101; the cache item whose key is "myfile" is stored at cache entry 102; and the cache item whose key is "mydir" is stored at cache entry N.

In order to be able to locate the entry number for any cache item, given its associated key as an input, the lockless-lookup hash table 303 has stored therein pairs of keys and entry numbers, where for a given pair, the entry number points to that entry in the cache where the key and its associated value are stored. The location in the lockless-lookup hash table into which each of the key/entry number pairs is placed is determined by a hash function that operates on the key to generate an initial index into the hash table, as well as by a collision strategy for locating an available entry if the initial index points to a location that is already occupied. Thus, in our example, the key "sys" has a hash value of N−1, so the pair "(sys, 0)" is stored at location N−1 in the lockless-lookup hash table 303. The "0" indicates that a cache item is stored at cache entry 0, as indicated by the arrow 305.

In the above example, it was assumed that the keys could be stored within the memory areas reserved for keys in the table of entries 201. However, in practice the length of a file name may vary a great deal, and may be very long (e.g., up to 255 bytes). It would be wasteful to reserve, for each cache entry, a key field equal to the maximum size of the file name. A better solution for this situation is to allow the key 203 to itself be a pointer to a memory area which can then be dynamically allocated as needed for each individual file name. However, a strategy must be adopted to ensure that a user does not deallocate the storage for a key unless it is absolutely certain that no other thread is looking at it.

In a preferred embodiment, no two cache items are permitted to have the same key. The reason for this is that cache items are located by matching their keys 203 with an input key value. If two cache items were permitted to have the same key 203, then only one of them would ever be located. For example, where the lookup engine is a lockless-lookup hash table as described above, any hash table lookup operation would always stop its search probe sequence after it encountered the first element whose key matched.

In order to utilize a lookup engine that can be relied on to return the above-described "hints," rather than always-accurate answers, the following strategy is adopted in accordance with the invention. If a lookup of an item in the lookup engine table 217 fails (i.e., the table says that no element having a matching key was found, so that a "cache miss" has apparently occurred), then the mutual exclusion cache lock 215 must be acquired and a second lookup for the item performed in order to verify that the item is indeed not in the cache. It will be recalled that acquisition of the cache lock 215 prevents any other thread from deleting or inserting an item into any of the cache entries. Since no thread will update the lookup engine without first acquiring the cache lock 215, lookup engine insertions and deletions will also be prevented, thereby ensuring that the lookup engine table 217 will produce accurate outputs for this verification operation. If it is found that the sought-after element actually was in the lookup engine table 217, the newly acquired entry number 221 may be utilized to locate the desired cache item. Regardless of whether the sought-after element is found to be in the lookup engine table 217, the cache lock 215 will be relinquished after this verification operation, so as not to further delay other threads.

Similarly, if a lookup of an item in the lookup engine table 217 succeeds (i.e., the key/entry number pair is reported to be found, so that a "cache hit" has apparently occurred), then the identity of the cache item that has been pointed to needs to be verified. In accordance with one aspect of the invention, rather than locking up the entire cache, only the pointed-to cache item's entry lock 207 is acquired. This provides assurance that the key 203 located at the pointed-to cache entry will not be deleted or otherwise changed. Upon obtaining the entry lock 207, the input key 219 can be compared with the key 203 to verify that the sought-after cache item was indeed found.

Another aspect of the invention will now be described. When a "cache miss" occurs, it is often the case that the thread receiving this report will want to take extra steps to obtain the sought-after information from another source, such as from a main memory or disk storage device. Upon obtaining the information, the thread would then take steps to store this information into the cache, so that it can more quickly be retrieved next time. Since storing an item into the cache requires acquisition of the mutual exclusion cache lock 215, the invention preferably includes a feature wherein the cache lookup function, upon determining that a cache miss has actually occurred, will go on to reserve a cache entry by writing just the key 203 into an available entry, marking the entry as "busy", and inserting the key 203 into the lockless-lookup engine 217. The entry lock 207 for this entry is also acquired, and a pointer to this entry is then returned to the calling thread with a return code indicating "new cache item". The user thread may then obtain the information from the alternative source and then store this information into the cache entry without having to wait to acquire the cache lock 215. Alternatively, the user thread may not want to acquire the sought-after information from an alternative source, in which case it should delete the newly created cache entry from the table of entries 201. Deletion of a cache entry is described in greater detail below.

Another aspect of the invention relates to a cache replacement policy. Such a policy specifies the conditions that determine which cache item should be removed from the cache if the cache is full. In a preferred embodiment, only those cache items that are not being used by any threads are candidates for replacement. The reference count 211 is used to indicate whether an item is currently in use or not. If the reference count 211 is zero, then the item is free; a non-zero reference count 211 means that the cache item is being used.

The strategy of the cache replacement policy is a modified version of a least recently used (LRU) scheme. Essentially, the entire cache table of entries 201 is logically divided into sets of sixteen cache entries. Sets are polled in a round robin fashion whenever an available cache entry is needed. A cache item will be the candidate for replacement if it is not being used, as indicated by the reference count 211 being set to zero. If more than one cache entry in the set of sixteen is not currently being used, then the least recently used, as indicated by the value of the last access time 209, will be selected for replacement. If every cache item in a set is being used, the current set is skipped, and the next set is examined. This continues until an acceptable candidate for replacement is selected. When another available cache entry is needed, the next candidate is chosen by applying the same strategy to the next set of sixteen cache items. The modified LRU cache replacement policy avoids the need for acquiring any kind of lock on the cache, which would otherwise be required for ordering the cache items in accordance with conventional LRU techniques. By determining the LRU order without holding any locks, it is possible that the entry selected by the modified LRU strategy will be used by another thread between the time of its selection and the time it is locked (although this is unlikely). However, in a preferred embodiment, absolute LRU ordering is not a necessity—close is good enough.

In yet another aspect of the invention, the cache 127 includes a call-back function for directly writing back the contents of the cache entry to another storage medium whenever that entry is about to be discarded from the cache as a result of an insertion or deletion. The particular steps performed by the call-back routine are application-specific: For a name cache, the call-back function does nothing; for a buffer cache, the contents of a reclaimed buffer must be written to disk before the buffer can be reused. The thread that is performing the insertion or deletion obtains the address of the call-back routine from the call-back information 225. The address of the call-back routine is placed into the call-back information 225 by the thread that created the cache table of entries 201 (henceforth referred to as "creator thread"). This gives the creator thread the ability to specify the actions that should take place whenever a cache entry is replaced.

One embodiment of the cache controller (e.g., the CPU 105 running the cache control program 125) will now be described with respect to FIGS. 4–11. It should be understood that although the following discussion refers to various values, this is done merely as a convenience, and that the following process actually describes one embodiment of means for generating control signals that control the operation of the exemplary computer system. Those having ordinary skill in the art will recognize that the following examples merely illustrate one embodiment of the invention, and that modifications to the exemplary embodiment can be made which would still fulfill all of the requirements described in this disclosure.

Access to the cache is provided to a user thread by two routines: Get_Cache_Entry and Delete_Cache_Entry. These will now be described.

Turning first to the Get_Cache_Entry routine, the user of the routine supplies a key to the routine. In response, the Get_Cache_Entry routine locates and locks the cache entry in the table of entries 201 that contains a cache item with the matching key. The reference count 211 of the cache entry is then incremented by one. The user is then supplied with a pointer to the entry in the table of entries 201. In the event that there is no such cache item already stored in the cache 127, then the Get_Cache_Entry routine will add the key 203 to a newly acquired cache entry, set the cache entry as "busy", lock it (not the entire cache, just the entry), and return a pointer to the locked entry. This prevents another thread from adding another entry with the same name to the table of entries 201, and allows the thread that called Get_Cache_Entry to obtain the associated information from another source and then store this information as the value 205. Alternatively, the user may do nothing more than delete the newly-created cache entry, so that another thread will have an opportunity to insert this information.

Referring now to FIG. 4, a flowchart of the Get_Cache_Entry routine 400 is shown. An overview of the routine is as follows: An attempt is made to find the requested entry in the table of entries 201 (subroutine call to "Find_Cache_Entry" at step 401). If it is found (cache hit="yes" at step 403), then the cache clock 213 is incremented (step 407), and the last access time 209 for the entry is set equal to the value of the cache clock 213 (step 409). Finally, a pointer to the cache entry is returned to the thread that called the Get_Cache_Entry routine 400 (step 411).

Alternatively, if the initial attempt to locate the requested entry failed (cache hit="no" at step 403), then an attempt is made to insert the key into a newly acquired cache entry, mark the entry as busy, and obtain a lock on the entry (subroutine call to "Insert_Cache_Item" at step 405). The reason why the word "attempt" was used in the previous sentence was because of the possibility that the requested item was inserted into the cache 127 after the Find_Cache_Entry routine (step 401) reported the item as not found. When this occurs, the Insert_Cache_Item routine 405 will not insert a new item, but will instead get a pointer to the previously inserted entry having the matching key. The item will be locked and marked as busy.

Referring now to FIG. 5, a flowchart of the Find_Cache_Entry routine 401 is shown. The routine begins by accessing the lockless-lookup hash table in an attempt to obtain an entry number associated with the user's key. If the hash table returns an indication that the element was not found (Cache Hit="no" at step 503), then the Find_Cache_Entry routine 401 returns to the Get_Cache_Entry routine 400 with a return code indicating "not found."

Alternatively, if the hash table actually returns an entry number (Cache Hit="yes" at step 503), then the following steps must be performed to confirm that this "hint" is accurate. First, the entry lock 207 for this entry (i.e., the one pointed to by entry number) is obtained. It is noted that this may require waiting for another thread to release it.

When the entry lock 207 has been acquired, the Find_Cache_Entry routine 401 is assured that the key 203 currently stored at the entry will not be changed. Consequently, it can proceed by reading this key 203, and comparing it with the key of the requested item in order to verify that they do match (step 509). If a match is found (Name Matched="yes" at step 511), the reference count 211 for this entry is incremented to mark the entry as "busy" (step 513) and a pointer to this cache entry is returned to the Get_Cache_Entry routine 400 (step 517). Note that the entry lock 207 for this cache entry is retained.

Alternatively, if the key 203 stored at this entry does not match the key of the requested item (Key Matched="no" at step 511), then the "hint" returned from the lockless-lookup hash table must have been wrong. Note, however, that the Find_Cache_Entry routine 401 is in no danger of accessing a memory location outside of the range of the table of entries 201, because of the lockless-lookup hash table's guarantee that only previously-stored entry numbers will be returned, even though no lock is obtained to perform lookup operations. Following the determination that the key 203 of the found entry does not match that of the requested item, the entry lock 207 for this entry is released (step 515), and the process repeats, beginning at step 501.

Referring now to FIG. 6, a flowchart of the Insert_Cache_Item routine 405 is shown. The routine begins by calling a subroutine entitled Get_Next_Available_Entry (step 601), which finds an available cache entry (call it "Cache Entry N") in accordance with the modified LRU strategy discussed above, and returns a pointer to that entry. The entry lock 207 for Cache Entry N has been acquired, and its reference count 211 has been incremented to indicate "busy."

Next, the cache lock 215 is acquired to disallow any other cache insert or delete operations (step 603). Once the cache lock 215 has been obtained, a subroutine entitled Reclaim_Cache_Entry is called (step 605). An input parameter of the Reclaim_Cache_Entry routine 605 is the pointer to Cache Entry N. The Reclaim_Cache_Entry routine 605 will remove the copy of Cache Entry N's old key from the lockless-lookup hash table, and then set Cache Entry N's last access time 209 equal to zero (to indicate that it is a free cache entry).

When these actions have been completed, the key of the item to be stored into the cache table of entries 201 is inserted into the lockless-lookup hash table 217 by calling a subroutine entitled Insert_Cache_Entry (step 607). This subroutine includes a check to make sure that a matching key is not already contained within the lockless-lookup hash table. Consequently, when Insert_Cache_Entry 607 returns to Insert_Cache_Item 405, the return code is checked (step 609) to see whether Cache Entry N's key was successfully inserted as a new element into the lockless lookup hash table 217. If the insert was successful, then the cache lock 215 is released in order to allow other insert or delete operations to proceed (step 611). Following this, a pointer to the newly created cache entry (i.e., Cache Entry N) is returned to Get_Cache_Entry routine 400 (step 613). The Cache Entry N is still locked, and marked "busy." Furthermore, the return code from this subroutine informs the Get_Cache_Entry routine 400 that this is a pointer to a new cache entry. The calling thread will use this information to determine whether the associated value 205 needs to be obtained from another source and written into this cache entry.

If the lockless lookup hash table 217 reported that another cache entry (call it "Cache Entry F"), having the same key as that of Cache Entry N, already had its key stored in the lockless-lookup hash table 217 (insert succeeded="no" at step 609), then the cache lock 215 is released in order to allow other insert or delete operations to proceed (step 615). At this point, other threads may change and delete items in the cache 127, so there is no longer any certainty that the pointer to Cache Entry F still points to an item whose key 203 matches the key of the item to be stored into the cache table of entries 201 (i.e., the pointer obtained from the lockless-lookup hash table has now become a "hint." In order to determine whether this "hint" is erroneous, the entry lock 207 for Cache Entry F is acquired (step 617), and the key of the requested item is compared with that of Cache Entry F (step 619). If the keys match (Key Matched="yes" at step 621), then the "hint" reported by the lockless-lookup hash table 217 was accurate, and the requested item really is already stored in the cache table of entries 201. Accordingly, Cache Entry F's reference count 211 is incremented in order to indicate that this item is "busy" (step 623), and the entry lock 207 of the previously obtained Cache Entry N is released, and the reference count 211 of Cache Entry N is decremented because this cache entry will not be used at this time (step 625). Instead, the pointer to Cache Entry F is returned to the Get_Cache_Entry routine 400 with the report that this is an already existing cache entry. This latter piece of information is important for the calling thread to know, because it will determine whether or not the value 205 needs to be obtained from another source and stored into the cache entry.

Alternatively, if comparison between the key of the requested item and that of Cache Entry F determines that the keys do not match (Key Matched="no" at step 621), then the "hint" reported by the lockless-lookup hash table 217 was inaccurate, and the entry lock 207 for Cache Entry F is released. The process is then repeated, beginning at step 603, to again determine whether Cache Entry N can be successfully inserted into the lockless-lookup hash table 217. Eventually, the loop will exit either at step 613 or at step 627.

The Get_Next_Available_Entry routine 601 will now be described in greater detail with reference to FIG. 7. The routine begins by making a subroutine call to Find_Cache_Entry_LRU (step 701). This subroutine returns a pointer to a cache entry (call it Cache Entry N) which is believed to be not busy, and therefore available for use as a new cache entry to be inserted by the Insert_Cache_Item routine 405. However, Cache Entry N's status as "not busy" is not a certainty, because no locks were employed to make this determination. Consequently, this status must be verified. First, an attempt is made to acquire Cache Entry N's entry lock 207 (step 703) (the attempt will succeed only if Cache Entry N was not already locked).

If the attempt to lock Cache Entry N was unsuccessful (Lock Succeeded="no" at step 705), then Cache Entry N cannot be used, and another cache entry should be found. This is because it is usually quicker to find an unlocked cache entry than it is to wait to acquire a lock on an already-locked entry. Finding another cache entry is accomplished by beginning the loop over again at step 701.

However, if the attempt to lock Cache Entry N was successful (Lock Succeeded="yes" at step 705), then Cache Entry N's reference count 211 is tested to see if Cache Entry N is busy. This may occur because it is permissible for a previous thread to have "gotten" Cache Entry N and subsequently released the entry lock 207 without decrementing the reference count 211. This would be done in order to ensure that Cache Entry N cannot be deleted or reclaimed by another thread.

If the reference count 211 is not equal to zero (Cache Entry N Busy="yes" at step 707), then Cache Entry N cannot be used, and another cache entry must be found. This is accomplished by releasing the entry lock 207 for Cache Entry N (step 709) and then beginning the loop over again at step 701.

However, if the reference count 211 is equal to zero (Cache Entry N Busy="no" at step 707), then the Cache Entry N can be used as a free cache entry. Accordingly, Cache Entry N's reference count 211 is incremented (to indicate that it is "busy") (step 711). If Cache Entry N contains a cache item, as indicated by its last access time 209 being greater than zero, (Cache Entry N Contains a Cache Item="yes" at step 713), then the item previously stored in Cache Entry N is "flushed," meaning that the call-back routine specified by the call-back information 225 is invoked for the purpose of performing cleanup and/or writing-back the contents of the cache item to a main location before the contents of the cache item are removed from the table of entries 201 (step 715). Alternatively, if Cache Entry N has never been used (Cache Entry N Contains a Cache Item="no" at step 713), then the call-back function is not invoked.

Finally, a pointer to Cache Entry N is returned to the Insert_Cache_Item routine (step 717). It is noted that Cache Entry N is locked and marked "busy" at this time.

The Find Cache_Entry_LRU routine 701 will now be described in greater detail with reference to FIG. 8. The routine begins by selecting one of the sixteen-cache entry sets into which the cache table of entries 201 has been logically divided (step 801). Selection is preferably made on a round-robin basis.

Next, the last access time 209 of each of the sixteen cache entries is analyzed, so that a list of cache entries can be created in ascending order, from least recently used to most recently used (step 803). Those cache entries having reference counts greater than zero are then removed from the list (step 805), leaving only those cache entries that appear to be not busy. The actual status of any of these cache entries cannot be guaranteed because no locks have been acquired to prevent cache items from being changed. If the list is empty ("yes" path out of step 807), then none of the cache entries from this set will be used. Another attempt to find a cache entry is made by repeating the loop, beginning at step 801.

However, if the list is not empty ("no" path out of step 807), then a pointer to the first cache entry in the list is returned to the Get_Next_Available_Entry routine 601 (step 809), this being the least recently used of the apparently not-busy cache entries.

In an alternative embodiment, the actual construction of a list as described above is avoided by merely scanning the cache entries in the set, and keeping track of the smallest non-busy entry that has been encountered so far.

The Reclaim_Cache_Entry routine 605 will now be described in greater detail with reference to FIG. 9. It should be understood that the caller of the Reclaim_Cache_Entry routine 605 is responsible for obtaining the cache lock 215, so that the various cache and hash table entries to be performed are guaranteed to produce accurate results.

An input to the Reclaim_Cache_Entry routine 605 is a pointer to a cache entry. The routine begins by determining whether the cache entry is already empty, which is indicated by the last access time 209 being set to zero. If the cache entry is already empty ("yes" path out of step 901), then nothing further needs to be done and the routine simply returns to the Insert_Cache_Item routine 405. It was mentioned earlier that the reference count is incremented each time the associated cache item is obtained by a thread. In order to avoid erroneously setting a reference time 209 to zero whenever the count value of the cache clock 213 "wraps around" from the maximum clock value back to zero, it is immediately set equal to a value of "1". Then, the cache lock 215 is acquired and the last access times 209 of all cache entries with non-zero last access times 209 are reset to "1". This temporarily disturbs the modified LRU cache replacement policy, but has the advantage of facilitating comparisons between the last access times 209 of cache entries.

If the cache entry is not already empty ("no" path out of step 901), then the cache item's key 203 is obtained (step 903) and used as an input to a lockless-lookup hash table delete operation (step 905), the purpose being to remove that element from the lockless-lookup hash table 217.

Next, the cache entry's last access time 209 is set equal to zero as an indicator that this cache entry is now empty (step 907). The routine then finishes by simply returning to the Insert_Cache_Item routine 405 (step 909).

The Insert_Cache_Entry routine 607 will now be described in more detail with reference to the flowchart of FIG. 10. It is noted that the calling routine (Insert_Cache_Item 405) has already obtained the cache lock 215, so that accesses to the lockless-lookup hash table 217 will return accurate results, and not merely "hints." The Insert_Cache_Entry routine 607 begins by performing a lookup operation to the lockless-lookup hash table 217 to determine whether a copy of the new cache item's key 203 is already in the hash table, thereby indicating that the cache item to be inserted is already stored in the cache table of entries 201 (step 1001). If a copy of the key 203 is reported as found (cache hit="yes" at step 1003), then a cache item having the same key cannot be inserted into the cache table of entries 201. Consequently, the Insert_Cache_Entry routine 607 returns to the calling routine with a return code indicating that the operation was not successful (step 1005).

However, if a copy of the key 203 is reported as not found by the lockless-lookup hash table 217, (cache hit="no" at step 1003), then an insertion into the lockless-lookup hash table 217 is performed, using the key 219 as the key in the hash table, and using the pointer to the new cache entry (Cache Entry N) as the associated value to be stored (step 1007). Then, the input key 219 is copied to the key 203 of the Cache Entry N (step 1009). When this operation has completed, the Insert_Cache_Entry routine 607 returns to the calling routine with a return code indicating that the operation was successful (step 1011).

The discussion will now focus on the Delete_Cache_Entry routine 1100 with reference to the flowchart of FIG. 11. Upon entry to this routine, the caller has already called the Get_Cache_Entry routine 400, and has acquired the entry lock 207 for the cache item to be deleted. First, a test is performed to see whether the caller has obtained the entry lock 207 for the cache entry to be deleted (Cache Entry Locked="no" at step 1101). If this cache entry has not been locked, then the Delete_Cache_Entry routine 1100 cannot proceed, and it returns to the caller with a return code indicating this failure (step 1103).

Alternatively, if the user has obtained the entry lock 207 for the cache entry to be deleted (Cache Entry Locked="yes" at step 1101), then the next step is to test to see whether the reference count 211 for this cache entry is equal to one (step 1105), which indicates that only one thread has marked this cache entry as "busy." Since, by definition, the reference count 211 would have been incremented by the thread wishing to do the delete operation, it can be deduced, from the reference count 211 equalling one, that the thread wishing to perform the delete is the only user of this cache entry. Consequently, if other threads have also marked this cache item as "busy" (Cache Entry Reference Count equal to 1="no" at step 1105), then the Delete_Cache_Entry routine 1100 cannot proceed, and it returns to the caller with a return code indicating this failure (step 1107).

However, if the thread wishing to delete this cache entry is the only user of this cache entry (Cache Entry Reference Count equal to 1="yes" at step 1105), then the delete can proceed successfully. This is preferably accomplished by getting the cache item (i.e., the key 203 and the value 205) contained in this cache entry (step 1109), and invoking the call-back function designated in the call-back information 225, in order to flush the cache item being deleted (i.e., to do cleanup and/or to write-back the contents of the cache item to a main location before the contents of the cache item are removed from the table of entries 201).

Next, the cache lock 215 is obtained (step 1113), and a delete operation is performed to the lockless-lookup hash table in order to remove the element designated by the key of the cache element to be deleted (step 1115).

Then, the cache lock 215 is released (step 1117), and the last access time 209 and reference count 211 of this cache entry are set to zero, to indicate that this cache entry may be selected as an available cache entry (step 1119). Finally, the Delete_Cache_Entry routine 1100 returns to the user, with a return code indicating successful completion (step 1121).

Use of the inventive cache 127 is straightforward. Since a thread has no way of knowing whether a cache item is already stored in the cache table of entries 201, the lookup and insert functions are both accessed by the above-described Get_Cache_Item routine 400. This routine always returns a pointer to a locked cache entry that is marked "busy." A return code is also provided in order to tell the user whether the cache entry is new, meaning that no value 205 is currently being stored for this key 203.

If a pointer to a new cache entry has been returned, the user thread may take steps to obtain the associated information from an alternative source. These operations are application-specific, and a more detailed discussion of them is beyond the scope of this disclosure.

If the user thread obtains the information associated with the key, it may then store this information directly into the cache entry because it holds the entry lock 207 to this cache entry. All users of the cache 127 should abide by the rule that writing anything into the cache table of entries 201 is forbidden unless the entry lock for the particular cache entry has first been obtained.

When a user thread no longer desires to store an item into the cache table of entries 201, it releases the entry lock 207. If the user thread also doesn't care whether the information remains in the cache or whether it is swapped out to make room for another cache item, it will also decrement the reference count 211 just prior to releasing the entry lock 207. However, if the user thread wants to ensure that a cache item having this key 203 remains in the cache table of entries 201, then it will release the entry lock 207 without first decrementing the reference count 211. This means that the cache replacement function will always consider this cache entry as "busy", and will never select it for replacement. It should also be noted that although the user thread can ensure that a cache item having this key 203 will remain in the cache table of entries 201, this does not ensure that no other thread will modify the value 205 of this cache item.

When a user thread wishes to delete a cache item, it does this by first getting the cache entry via the Get_Cache_Entry routine 400. Then, it simply calls the Delete_Cache_Entry routine 1100. If the user thread is the only user of this particular entry, a return code indicating "successful" should be returned.

A preferred embodiment provides a number of routines, which are divided into cache-wide operations, and cache entry operations. These routines, which include all of those described above, are preferably implemented by means of the C++ programming language on a Sun SPARC machine having multiple CPUs. Those having ordinary skill in the art will readily be able to create these routines from the description provided below.

Cache-wide operations:
create_cache: This routine creates the cache 127. Its input parameters are:
  number_of_cache_entries;
  size_of_each_cache_item;
  pointer_to_equal_function;
  pointer_to_hash_function;
  pointer_to_get_key_function; and
  pointer_to_write_back_function.

The input parameters for the create_cache routine are described as follows:
  number_of_cache_entries: Defines the number of entries in the cache;
  size_of_each_cache_item: Defines the size of memory to be allocated for each item in the cache;
  pointer_to_equal_function: Points to equal_function(pointer_to_key1, pointer_to_key2), which is a function that returns a value of "true" if key1 equals key2;
  pointer_to_hash_function: Points to hash_function(pointer_to_key), which is a function that applies a hash function to the input key and returns the result.
  pointer_to_get_key_function: points to get_key_function(pointer_to_cache_entry), which is a function that returns a pointer to the key belonging to the cache_item.
  pointer_to_write_back_function: points to write_back_function(pointer_to_locked_cache_entry), which is a function that flushes a cache item as described in more detail above. It is needed for performing whatever write-back or cleanup operations may be required by the particular application.
get_cache_entry(cache_id key, bool &new_cache_entry): Given a pointer to the key of a cache item, this routine returns a pointer to the cache entry containing a cache item with the same matching key. The boolean value new_cache_entry indicates whether the cache item is a new or previously existing item.
delete_cache_entry(cache_entry *cp): This routine removes the cache item contained in the cache entry (pointer) from the cache. The cache entry must first be locked for exclusive use before calling this routine.

Cache Entry Operations:
mutex_lock(pointer_to_cache_entry): This function acquires the entry lock 207 for the indicated cache_entry. The entry lock 207 is a mutual exclusion lock.
mutex_unlock(pointer_to_cache_entry): This function releases the entry lock 207 for the indicated cache_entry.
hold(pointer_to_cache entry): This function increments the reference count 211 for the indicated cache entry. Incrementing the reference count 211 causes the cache entry to be marked as "busy." Although the get_cache_entry routine also increments the reference count 211 of the cache entry that it returns, it is possible for a thread to release the entry (i.e., decrement the reference count 211) and then change its mind about this and want to mark the entry "busy" again. The hold function is provided for this purpose. The entry lock 207 for the indicated cache entry must be acquired before invoking the hold function.
release(pointer_to_cache_entry): This function decrements the reference count 211 for the cache entry. The entry lock 207 for the indicated cache entry must be acquired before invoking the release function.
get_key(): This function returns a pointer to the cache key 203.
get_value(): This function returns a pointer to the value 205.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. In a multi-threaded processing system having a cache that is commonly accessible to each thread, wherein the cache has a plurality of entries for storing items, each entry being identified by an entry number and having a reference counter which indicates whether the entry is currently busy and a time stamp which records the last time the entry is accessed, a method of selecting an entry for storage of a new item, the method comprising the steps of:

a) logically dividing the plurality of entries into sets of entries of equal size;
   b) selecting in a round robin fashion one of the sets of entries, wherein one of the entries in the set will be used to store the new item;
   c) arranging the entries in the selected set from step b into an ordered list according to the time each entry in the set was last accessed, wherein entries that are busy are ignored;
   d) if the list from step c is empty, repeating steps b–d;
   e) if the list from step c is not empty, then for each entry in the list, starting with the first entry in the list, verifying that the entry is available for storage of the new item; and
   f) repeating steps b–f if no entry is found available for storage in step e.

2. The method of claim 1, wherein each set of entries is uniquely assigned a number, starting with 1, the numbers of the sets being consecutive, the last set being assigned a set number that is the same as the number of sets in the cache, and wherein the selecting step comprises:

selecting, in a round robin fashion, one of the sets of entries wherein of the entries in the set will be used to store the new item, the set being selected having a set number that is 1 greater than the set number of the set that was previously selected, or set number 1 if the previously selected set is the set that has the greatest set number, and if no such set exists, then selecting the set with a set number 1.

3. The method of claim 1, wherein an entry is busy if the reference counter has a value that is greater than zero.

4. The method of claim 1, wherein the verification to determine whether an entry is available for storage of a new item comprises the steps of:

a) acquiring a mutual exclusion lock which grants exclusive access only to the entry that is being verified;
   b) indicating that the entry is not available if another thread is currently holding a mutual exclusion lock on the entry; and
   c) indicating that the entry is available if the reference counter has a value equal to zero, or if the entry has not been used to store any item.

5. The method of claim 4, further comprising the step of invoking a call back function to flush present contents of the new cache entry to a main storage location.

6. The method of claim 4, wherein a time stamp of zero indicates that the entry has not been used to store any item.

7. In a multi-threaded processing system having a cache that is commonly accessible to each thread, wherein the cache has a plurality of entries for storing items, each entry being identified by an entry number and having a reference counter which indicates whether the entry is currently busy and a time stamp which records the last time the entry is accessed, an apparatus for selecting an entry for storage of a new item, the apparatus comprising:

a) means for logically dividing the plurality of entries into sets of entries of equal size;
   b) means for selecting in a round robin fashion one of the sets of entries, wherein one of the entries in the set will be used to store the new item;
   c) means for arranging the entries in the selected set into an ordered list according to the time each entry in the set was last accessed, wherein entries that are busy are ignored;
   d) means for determining if the selected set is empty, the means for determining causing said means for arranging to proceed to a next set if the selected set is empty; and
   e) means for verifying, for each entry in the list starting with the first entry, that the entry is available for storage of the new item if the means for determining determines that the selected set is not empty, the means for verifying causing said means for arranging to proceed to a next set if the verification fails.

8. The apparatus of claim 7, wherein each set of entries is uniquely assigned a number, starting with 1, the numbers of the sets being consecutive, the last set being assigned a set number that is the same as the number of sets in the cache, and wherein the means for selecting selects, in a round robin fashion, one of the sets of entries wherein of the entries in the set will be used to store the new item, the set being selected having a set number that is 1 greater than the set number of the set that was previously selected, or set number 1 if the previously selected set is the set that has the greatest set number, and if no such set exists, then selecting the set with a set number 1.

9. The apparatus of claim 7, wherein an entry is busy if the reference counter has a value that is greater than zero.

10. The apparatus of claim 7, wherein the means for verifying comprises:

a) means for acquiring a mutual exclusion lock which grants exclusive access only to the entry that is being verified;
   b) means for indicating that the entry is not available if another thread is currently holding a mutual exclusion lock on the entry; and for indicating that the entry is available if the reference counter has a value equal to zero, or if the entry has not been used to store any item.

11. The apparatus of claim 10, further comprising a means for invoking a call back function to flush present contents of the new cache entry to a main storage location.

12. The apparatus of claim 10, wherein a time stamp of zero indicates that the entry has not been used to store any item.

13. An article of manufacture for use in a multi-threaded processing system having a cache that is commonly accessible to each thread, wherein the cache has a plurality of entries for storing items, each entry being identified by an entry number and having a reference counter which indicates whether the entry is currently busy and a time stamp which records the last time the entry is accessed, the article of manufacture comprising:

a computer usable medium having computer readable program code configured to select an entry for storage of a new item, the computer readable program code in the article of manufacture comprising:

a) computer readable program code configured to effect logical division of the plurality of entries into sets of entries of equal size;
  b) computer readable program code configured to effect selection, in a round robin fashion, of one of the sets of entries, wherein one of the entries in the set will be used to store the new item;
  c) computer readable program code configured to effect the arrangement of the entries in the selected set into an ordered list according to the time each entry in the set was last accessed, wherein entries that are busy are ignored;
  d) computer readable program code configured to determine if the selected set is empty, and to cause said program code configured to effect the arrangement of the entries to proceed to a next set if the selected set is empty; and
  e) computer readable program code configured to verify, for each entry in the list starting with the first entry, that the entry is available for storage of the new item if the code configured to determine if the selected set is empty determines that the selected set is not empty, and causing the code configured to effect the arrangement of the entries to proceed to a next set if the verification fails.

14. The article of manufacture of claim 13, wherein each set of entries is uniquely assigned a number, starting with 1, the numbers of the sets being consecutive, the last set being assigned a set number that is the same as the number of sets in the cache, and wherein the computer readable program code configured for selecting selects, in a round robin fashion, one of the sets of entries wherein of the entries in the set will be used to store the new item, the set being selected having a set number that is 1 greater than the set number of the set that was previously selected, or set number 1 if the previously selected set is the set that has the greatest set number, and if no such set exists, then selecting the set with a set number 1.

15. The article of manufacture of claim 13, wherein an entry is busy if the reference counter has a value that is greater than zero.

16. The article of manufacture of claim 13, wherein the code configured to verify comprises:
  a) computer readable program code configured to acquire a mutual exclusion lock which grants exclusive access only to the entry that is being verified;
  b) computer readable program code configured to indicate that the entry is not available if another thread is currently holding a mutual exclusion lock on the entry; and to indicate that the entry is available if the reference counter has a value equal to zero, or if the entry has not been used to store any item.

17. The article of manufacture of claim 16, further comprising a means for invoking a call back function to flush present contents of the new cache entry to a main storage location.

18. The article of manufacture of claim 16, wherein a time stamp of zero indicates that the entry has not been used to store any item.

* * * * *